United States Patent [19]

McGrew et al.

[11] Patent Number: 5,336,509
[45] Date of Patent: Aug. 9, 1994

[54] WAX-FREE LOW CALORIE, HIGH BASE CHEWING GUM

[75] Inventors: Gordon McGrew, Evanston, Ill.; Steven P. Synosky, Green Brook, N.J.

[73] Assignee: The Wm. Wrigley Jr. Company, Chicago, Ill.

[21] Appl. No.: 997,876

[22] Filed: Dec. 29, 1992

Related U.S. Application Data

[63] Continuation-in-part of Ser. No. 906,921, Jun. 30, 1992, Pat. No. 5,286,500.

[51] Int. Cl.⁵ ............................................. A23G 3/30
[52] U.S. Cl. ....................................... 426/3; 426/658; 426/804
[58] Field of Search ..................................... 426/3–6, 426/804, 658

[56] References Cited

U.S. PATENT DOCUMENTS

| | | | |
|---|---|---|---|
| 1,534,929 | 4/1925 | Dunham | 426/4 |
| 3,984,574 | 10/1976 | Comollo | 426/4 |
| 4,241,091 | 12/1980 | Stroz et al. | 426/4 |
| 4,252,830 | 2/1981 | Kehoe et al. | 426/5 |
| 4,357,354 | 11/1982 | Kehoe et al. | 426/3 |
| 4,382,963 | 5/1983 | Klose et al. | 426/3 |
| 4,698,223 | 10/1987 | Perfetti et al. | 426/4 |
| 4,915,958 | 4/1990 | Faust et al. | 426/3 |
| 4,933,189 | 6/1990 | Cherukuri et al. | 426/3 |
| 4,980,177 | 12/1990 | Cherukuri et al. | 426/3 |
| 5,023,093 | 6/1991 | Cherukuri et al. | 426/3 |
| 5,039,530 | 8/1991 | Yatka et al. | 426/3 |

FOREIGN PATENT DOCUMENTS

| | | |
|---|---|---|
| 0067665A2 | 12/1982 | European Pat. Off. . |
| 347376 | 4/1931 | United Kingdom . |
| 378073 | 8/1932 | United Kingdom . |

*Primary Examiner*—Jeanette Hunter
*Attorney, Agent, or Firm*—Hill, Steadman & Simpson

[57] ABSTRACT

The present invention provides a low calorie, high base chewing gum and methods for making same. The low calorie, high base chewing gum will include at least 70%, by weight, of a wax-free, or substantially wax-free, gum base. In an embodiment, a low calorie, high base chewing gum is provided comprising: at least 70% of a wax-free base; less than 30% bulking agent; and less than or equal to 7% flavor. Pursuant to the present invention, reduced levels of flavoring agents, as compared to typical low calorie, high base chewing gums can be used.

54 Claims, No Drawings

WAX-FREE LOW CALORIE, HIGH BASE CHEWING GUM

This is a continuation-in-part of U.S. patent application Ser. No. 07/906,921 filed on Jun. 30, 1992 now U.S. Pat. No. 5,286,500 entitled: "IMPROVED WAX-FREE CHEWING GUM BASE" that names Steven Synosky and Michael Reed as the inventors which is a continuation-in-part of PCT patent application No. PCT/US92/01686 filed on Mar. 3, 1992, in the U.S. Receiving Office under the Patent Cooperation Treaty entitled: "IMPROVED WAX-FREE CHEWING GUM BASE" and naming Steven Synosky as the inventor.

FIELD OF THE INVENTION

The present invention relates to low calorie chewing gum and to methods of preparing low calorie chewing gum.

BACKGROUND OF THE INVENTION

Recently, in the United Kingdom, the use of wax, especially mineral hydrocarbon wax, in gum bases, has come under scrutiny. There is a perception in the United Kingdom that it may not be desirable to use wax in gum bases. This perception could result in possible regulatory issues, in the United Kingdom, concerning the use of wax in gum base.

Unfortunately, one cannot merely remove wax from a gum base without possibly compromising certain desirable characteristics of the resulting chewing gum product. Wax provides a number of functions in the gum base. For example, wax can influence the release of flavor from the gum product. Furthermore, wax aids in the curing of the finished gum product that is made from the gum base. Additionally, wax contributes to the shelf-life of the finished gum and its texture.

Although some gum bases are known that do not contain wax, they, the inventor believes, typically do not have the chew characteristics, in addition to other characteristics, of typical chewing gums that are created from wax containing gum bases. Heretofore, gum bases without wax were not created in response to any regulatory concerns, but rather, were merely created as part of bases to achieve other ends, for example, a non-tack gum. Therefore, in certain instances, compromises with respect to certain characteristics may have been made to achieve other results, e.g., non-tack, promote stability of certain ingredients, etc.

U.S. Pat. No. 3,984,574, issued to Comollo, discloses an abhesive chewing gum base in which the non-tack properties were achieved by eliminating conventional chewing gum base ingredients which were found to contribute to chewing gum tackiness, and by substituting non-tacky ingredients in place of the conventional ingredients. Specifically, it was discovered that three classes of materials account for conventional chewing gum tackiness. These materials are elastomers, resins, and waxes.

Comollo eliminated natural and some synthetic elastomer from the chewing gum base, and substituted in their place one or more non-tacky synthetic elastomers such as polyisobutylene, polyisoprene, isobutylene-isoprene copolymer and butadiene-styrene copolymer. Comollo also eliminated the tack-producing natural resins and modified natural resins and used instead relatively high amounts of hydrogenated or partially hydrogenated vegetable oils or animal fats. Finally, Comollo completely excluded waxes from the gum base, but included polyvinyl acetate, fatty acids, and mono and diglycerides of fatty acids.

Providing a reduced or low calorie chewing gum has long been a goal in the chewing gum industry. A method used to attempt to provide satisfactory low calorie chewing gum is to reduce or eliminate the caloric bulking agent. Typically, this bulking agent accounts for virtually all of the calories in a typical gum product. Although such low calorie gum products are known, there are several disadvantages with such products.

In order to compensate for the bulking agent, that is reduced or eliminated, the proportion of gum base is increased. These low caloric gum products therefore have high base levels. However, this results in an inherently expensive product because the gum base is usually more expensive than the bulking agent.

Indeed, the cost issue is exacerbated by the fact that flavor, an even more expensive ingredient, must be increased in proportion to the base. Usual gum bases will bind with flavor so that a large portion of the flavor will not be released and therefore, the flavor will not be perceivable to the chewer. Therefore, to achieve an equivalent flavor impact, a higher flavor level must be used.

A further concern is that chewing gums that have a high percent of gum base typically also have high wax content. This increases the concerns raised above with respect to wax.

There is therefore a need for an improved low calorie, high base chewing gum and method for making same.

SUMMARY OF THE INVENTION

The present invention is directed to low calorie, high base chewing gums and methods of making same. It has surprisingly been found that by creating a low calorie chewing gum using a wax-free gum base, that lower flavor levels can be used than heretofore used in typical low calorie, high base chewing gums. Additionally, the chewing gum composition of the present invention addresses the concerns relating to wax that have recently been raised in certain areas.

The low calorie, high base chewing gum will include at least 70% of a wax-free, or substantially wax-free, gum base. The gum base includes quantities of elastomer (synthetic, natural, or both), elastomer plasticizer, filler and softener, and is substantially free of wax. The gum base of the invention may also contain optional quantities of minor ingredients such as color and antioxidant.

In an embodiment, a low calorie, high base chewing gum is provided comprising: at least 70% of a wax-free base; less than 30% bulking agent; and less than or equal to 7% flavor by weight of the gum base.

In an embodiment, the bulking agent is a low calorie bulking agent. However, in another embodiment, the chewing gum includes no bulking agent.

In an embodiment, a low calorie, high base chewing gum is provided that comprises at least a majority of the chewing gum having a wax-free base that includes an elastomer, polyvinyl acetate, an elastomer plasticizer, and a sufficient amount of oil having a capillary melting point between 40° C. and 70° C. to achieve flavor release characteristics that are at least as good as a similar gum base that includes wax. The chewing gum includes no more than 7% by weight flavor and less than 30% by weight bulking agent.

In an embodiment, a low calorie, high base chewing gum having reduced flavor as compared to similar chewing gum including wax is provided. The chewing gum comprises: an artificial sweetener; one or more flavoring agents; and a water insoluble gum base including an elastomer, an elastomer plasticizer, polyvinyl acetate, and a softener wherein the softening point of the gum base is at least 5° C. less than a similar gum base having wax.

The present invention also provides methods for creating low calorie, high base chewing gum having reduced flavoring agents. In an embodiment, the method comprises the steps of: providing a gum base that is substantially free of wax; and creating a low calorie chewing gum comprising a majority of its composition as the gum base and having reduced flavoring agents as compared to a low calorie chewing gum having a similar proportion of gum base created from a wax containing gum base.

In another embodiment, a method for creating a low calorie, high base chewing gum is provided comprising the steps of: creating a gum base from at least an elastomer, an elastomer plasticizer, polyvinyl acetate, and a softener; choosing the percent and type of at least the softener or the elastomer plasticizer to create a gum base having characteristics substantially similar to a similar gum base including wax; adding to the gum base an amount of flavor that is less than an amount required to be added to a low calorie, high base chewing gum, including wax, to achieve similar chewing flavor characteristics.

It is an advantage of the invention to provide a low calorie, high base chewing gum.

It is a further advantage of the present invention to provide a low calorie, high base chewing gum that includes a substantially wax-free chewing gum base.

It is also an advantage of the invention to provide a low calorie, high base chewing gum that is less expensive to manufacture than typical low calorie, high base chewing gums.

It is an advantage of the invention to provide an improved chewing gum which contains a wax-free chewing gum base.

It is also an advantage of the invention to provide an improved chewing gum made from the wax-free base which does not retain the amount of flavor typical low calorie and/or wax containing gums retain after chewing.

It is also an advantage of the invention to provide an improved chewing gum that hydrates better during about one to three minutes of chewing.

It is a further advantage of the present invention to provide a method for manufacturing low calorie, high base chewing gum.

It is an advantage of the present invention to provide a chewing gum including a wax-free gum base that has chew characteristics at least as good as chewing gum created from wax containing gum bases.

The foregoing and other features and advantages will become further apparent from the following detailed description of the presently preferred embodiments, when read in conjunction with the accompanying examples. It should be understood that the detailed description and examples are illustrative rather than limitative, the scope of the present invention being defined by the appended claims and equivalents thereof.

DETAILED DESCRIPTION OF THE PRESENT PREFERRED EMBODIMENTS

In accordance with the invention, low calorie, high base chewing gums are provided. The low calorie, high base chewing gums include gum bases that are wax-free or at least substantially wax-free. As used herein, "high base" means that the majority of the chewing gum, by weight, comprises the gum base. Preferably, the chewing gums will have gum base levels of at least 70% by weight. In a preferred embodiment, the gum base levels are at least 90%.

In an embodiment, the chewing gum base of the invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is abhesive or conventional, bubble gum or regular gum, as discussed below. The preferred natural elastomers are jelutong, chicle, sorva and massaranduba balata.

Elastomer plasticizers may include, but are not limited to, natural rosin esters such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof. Hydrogenated vegetable oils are generally preferred, either alone or in combination with other softeners. As discussed in detail below, the selection and amount of oils has been determined to, at least with respect to certain bases and at least in part, compensate for the removal of wax.

Colorants and whiteners may include FD&C-type dyes and lakes, fruit and vegetable extracts, titanium dioxide, and combinations thereof.

When the wax-free gum base of the invention is to be used in a regular (non-bubble) gum which has at least some abhesive (reduced tack) characteristics, the base should preferably contain about 10 to about 40 weight percent synthetic elastomer, about 15 to about 30 weight percent elastomer plasticizer, about 5 to about 30 weight percent filler, about 15 to about 35 weight percent softener, 0 to about 1 weight percent colorant and 0 to about 0.1 weight percent antioxidant. By way of example, specific embodiments of the wax-free gum base are provided in Examples 1–30 below.

TABLE 1
WAX-FREE GUM BASES FOR USE IN CHEWING GUM HAVING SOME REDUCED TACK CHARACTERISTICS (EXAMPLES 1–30)

EXAMPLES 1–4

| GENERIC INGREDIENTS | IDENTIFICATION - EXAMPLES #: | | | |
|---|---|---|---|---|
| | 1 | 2 | 3 | 4 |
| SYNTHETIC ELASTOMER | | | | |
| STYRENE-BUTADIENE ELASTOMER | 5.3 | — | 2.1 | 1.3 |
| BUTYL (ISOPRENE-ISOBUTYLENE) ELASTOMER | 8.6 | 7.9 | 7.2 | 14.8 |
| POLYISOBUTYLENE ELASTOMER | 7.1 | — | 7.4 | 5.2 |
| POLYVINYL ACETATE | 10.5 | 27.2 | 15.3 | 12.1 |
| ELASTOMER PLASTICIZERS | | | | |
| GLYCEROL ESTERS OF ROSIN | 2.1 | — | 19.0 | — |
| GLYCEROL ESTERS OF PART HYD ROSIN | 4.3 | 18.2 | — | 15.3 |
| TERPENE RESINS | 10.8 | — | — | — |
| FILLER | | | | |
| CALCIUM CARBONATE | — | 15.9 | 20.7 | — |
| TALC | 25.5 | — | — | 16.7 |
| SOFTENER | | | | |
| HYDROGENATED VEGETABLE OIL | 15.3 | 22.6 | 24.3 | 28.4 |
| GLYCEROL MONOSTEARATE | 8.2 | 7.4 | 4.0 | 5.1 |
| LECITHIN | 2.3 | 0.8 | — | 1.1 |
| TOTAL PERCENT | 100.0 | 100.0 | 100.0 | 100.0 |

EXAMPLES 5–8

| GENERIC INGREDIENTS | IDENTIFICATION - EXAMPLES #: | | | |
|---|---|---|---|---|
| | 5 | 6 | 7 | 8 |
| SYNTHETIC ELASTOMER | | | | |
| STYRENE-BUTADIENE ELASTOMER | 1.8 | — | — | — |
| BUTYL (ISOPRENE-ISOBUTYLENE) ELASTOMER | — | 8.1 | 14.6 | 9.4 |
| POLYISOBUTYLENE ELASTOMER | 24.8 | 3.6 | 1.2 | 13.0 |
| POLYVINYL ACETATE | 10.1 | 27.5 | 26.2 | 22.3 |
| ELASTOMER PLASTICIZERS | | | | |
| GLYCEROL ESTERS OF ROSIN | 3.7 | — | 4.9 | — |
| GLYCEROL ESTERS OF PART HYD ROSIN | 7.9 | — | 12.6 | — |
| TERPENE RESINS | 7.1 | 27.1 | — | 10.0 |
| FILLER | | | | |
| CALCIUM CARBONATE | 17.7 | 10.9 | — | 20.0 |
| TALC | — | — | 13.1 | — |
| SOFTENER | | | | |
| HYDROGENATED VEGETABLE OIL | 21.0 | 14.3 | 16.6 | 20.7 |
| GLYCEROL MONOSTEARATE | 3.5 | 4.8 | 9.6 | 4.6 |
| LECITHIN | 2.4 | 3.7 | 1.2 | — |
| TOTAL PERCENT | 100.0 | 100.0 | 100.0 | 100.0 |

EXAMPLES 9–12

| GENERIC INGREDIENTS | IDENTIFICATION - EXAMPLES #: | | | |
|---|---|---|---|---|
| | 9 | 10 | 11 | 12 |
| SYNTHETIC ELASTOMER | | | | |
| STYRENE-BUTADIENE ELASTOMER | 5.2 | 2.1 | 4.3 | 5.9 |
| BUTYL (ISOPRENE-ISOBUTYLENE) ELASTOMER | 4.1 | 7.2 | 6.2 | 6.9 |
| POLYISOBUTYLENE ELASTOMER | 5.9 | 7.3 | 6.4 | 2.0 |
| POLYVINYL ACETATE | 25.7 | 15.3 | 21.8 | 24.8 |
| ELASTOMER PLASTICIZERS | | | | |
| GLYCEROL ESTERS OF ROSIN | 23.5 | 19.1 | 2.6 | 8.6 |
| GLYCEROL ESTERS OF PART HYD ROSIN | — | — | — | 8.0 |
| TERPENE RESINS | 3.2 | — | 17.1 | 1.9 |
| FILLER | | | | |
| CALCIUM CARBONATE | 15.1 | 20.7 | — | 9.9 |
| TALC | — | — | 14.6 | 7.2 |
| SOFTENER | | | | |
| HYDROGENATED VEGETABLE OIL | 12.2 | 24.3 | 19.5 | 21.1 |
| GLYCEROL MONOSTEARATE | 5.1 | 4.0 | 4.4 | 3.7 |
| LECITHIN | — | — | 3.1 | — |
| TOTAL PERCENT | 100.0 | 100.0 | 100.0 | 100.0 |

EXAMPLES 13–16

| GENERIC INGREDIENTS | IDENTIFICATION - EXAMPLES #: | | | |
|---|---|---|---|---|
| | 13 | 14 | 15 | 16 |
| SYNTHETIC ELASTOMER | | | | |
| STYRENE-BUTADIENE ELASTOMER | 3.9 | — | 2.1 | 1.6 |
| BUTYL (ISOPRENE-ISOBUTYLENE) ELASTOMER | 5.3 | 9.3 | 6.0 | 3.7 |
| POLYISOBUTYLENE ELASTOMER | 12.7 | 12.1 | 8.5 | 6.8 |
| POLYVINYL ACETATE | 14.9 | 21.4 | 15.3 | 22.3 |
| ELASTOMER PLASTICIZERS | | | | |
| GLYCEROL ESTERS OF ROSIN | — | — | 10.1 | 9.9 |
| GLYCEROL ESTERS OF PART HYD ROSIN | — | — | 8.9 | 4.3 |

TABLE 1-continued
WAX-FREE GUM BASES FOR USE IN CHEWING GUM HAVING SOME REDUCED TACK CHARACTERISTICS (EXAMPLES 1-30)

| | | | | |
|---|---|---|---|---|
| TERPENE RESINS | 21.4 | 6.5 | — | 11.6 |
| FILLER | | | | |
| CALCIUM CARBONATE | 13.7 | 21.4 | 20.9 | — |
| TALC | 1.4 | — | — | 17.2 |
| SOFTENER | | | | |
| HYDROGENATED VEGETABLE OIL | 18.7 | 25.2 | 24.2 | 17.8 |
| GLYCEROL MONOSTEARATE | 5.7 | 4.1 | 4.0 | 4.8 |
| LECITHIN | 2.3 | — | — | — |
| TOTAL PERCENT | 100.0 | 100.0 | 100.0 | 100.0 |

EXAMPLES 17-20

| GENERIC INGREDIENTS | 17 | 18 | 19 | 20 |
|---|---|---|---|---|
| SYNTHETIC ELASTOMER | | | | |
| STYRENE-BUTADIENE ELASTOMER | — | 2.7 | — | — |
| BUTYL (ISOPRENE-ISOBUTYLENE) ELASTOMER | 8.1 | 2.3 | 8.9 | 3.6 |
| POLYISOBUTYLENE ELASTOMER | 3.6 | 14.2 | 10.0 | 11.1 |
| POLYVINYL ACETATE | 27.3 | 17.3 | 21.3 | 21.9 |
| ELASTOMER PLASTICIZERS | | | | |
| GLYCEROL ESTERS OF ROSIN | — | — | — | 19.6 |
| GLYCEROL ESTERS OF PART HYD ROSIN | — | 27.3 | — | 11.2 |
| TERPENE RESINS | 26.9 | — | 9.7 | 3.7 |
| FILLER | | | | |
| CALCIUM CARBONATE | 11.3 | — | 21.5 | 6.4 |
| TALC | — | 8.2 | — | — |
| SOFTENER | | | | |
| HYDROGENATED VEGETABLE OIL | 14.3 | 22.4 | 23.2 | 19.2 |
| GLYCEROL MONOSTEARATE | 4.8 | 2.7 | 5.4 | 3.3 |
| LECITHIN | 3.7 | 2.9 | — | — |
| TOTAL PERCENT | 100.0 | 100.0 | 100.0 | 100.0 |

EXAMPLES 21-24

| GENERIC INGREDIENTS | 21 | 22 | 23 | 24 |
|---|---|---|---|---|
| SYNTHETIC ELASTOMER | | | | |
| STYRENE-BUTADIENE ELASTOMER | — | 1.4 | 3.2 | — |
| BUTYL (ISOPRENE-ISOBUTYLENE) ELASTOMER | 7.4 | 8.4 | 7.3 | 8.8 |
| POLYISOBUTYLENE ELASTOMER | 1.9 | 1.6 | 7.5 | 3.5 |
| POLYVINYL ACETATE | 24.8 | 23.1 | 21.1 | 27.9 |
| ELASTOMER PLASTICIZERS | | | | |
| GLYCEROL ESTERS OF ROSIN | — | 13.1 | 15.3 | — |
| GLYCEROL ESTERS OF PART HYD ROSIN | — | 22.1 | 2.4 | — |
| TERPENE RESINS | 25.8 | 3.6 | 5.8 | 27.4 |
| FILLER | | | | |
| CALCIUM CARBONATE | 18.6 | — | — | 11.9 |
| TALC | — | 7.3 | 14.8 | — |
| SOFTENER | | | | |
| HYDROGENATED VEGETABLE OIL | 12.3 | 11.3 | 19.8 | 12.3 |
| GLYCEROL MONOSTEARATE | 4.8 | 4.4 | 2.8 | 4.7 |
| LECITHIN | 4.8 | 3.7 | — | 3.5 |
| TOTAL PERCENT | 100.0 | 100.0 | 100.0 | 100.0 |

EXAMPLES 25-28

| GENERIC INGREDIENTS | 25 | 26 | 27 | 28 |
|---|---|---|---|---|
| SYNTHETIC ELASTOMER | | | | |
| STYRENE-BUTADIENE ELASTOMER | 4.1 | — | — | — |
| BUTYL (ISOPRENE-ISOBUTYLENE) ELASTOMER | 11.3 | 10.0 | 9.2 | 2.4 |
| POLYISOBUTYLENE ELASTOMER | 7.9 | 1.9 | 6.3 | 8.4 |
| POLYVINYL ACETATE | 18.2 | 27.6 | 13.1 | 20.5 |
| ELASTOMER PLASTICIZERS | | | | |
| GLYCEROL ESTERS OF ROSIN | — | — | — | — |
| GLYCEROL ESTERS OF PART HYD ROSIN | 26.2 | — | 19.9 | — |
| TERPENE RESINS | 1.4 | 25.3 | — | 23.5 |
| FILLER | | | | |
| CALCIUM CARBONATE | 13.6 | 11.3 | 22.3 | — |
| TALC | — | — | — | 15.6 |
| SOFTENER | | | | |
| HYDROGENATED VEGETABLE OIL | 8.2 | 15.4 | 18.6 | 19.2 |
| GLYCEROL MONOSTEARATE | 5.2 | 4.8 | 10.6 | 8.9 |
| LECITHIN | 3.9 | 3.7 | — | 1.5 |
| TOTAL PERCENT | 100.0 | 100.0 | 100.0 | 100.0 |

EXAMPLES 29-30

| GENERIC INGREDIENTS | 29 | 30 |
|---|---|---|
| SYNTHETIC ELASTOMER | | |
| STYRENE-BUTADIENE ELASTOMER | — | — |
| BUTYL (ISOPRENE-ISOBUTYLENE) ELASTOMER | 8.3 | 8.8 |
| POLYISOBUTYLENE ELASTOMER | 3.6 | 2.3 |
| POLYVINYL ACETATE | 27.5 | 27.4 |
| ELASTOMER PLASTICIZERS | | |
| GLYCEROL ESTERS OF ROSIN | — | — |
| GLYCEROL ESTERS OF PART HYD ROSIN | — | — |
| TERPENE RESINS | 25.3 | 28.3 |
| FILLER | | |
| CALCIUM CARBONATE | 11.3 | 12.5 |
| TALC | — | — |
| SOFTENER | | |
| HYDROGENATED VEGETABLE OIL | 16.5 | 12.5 |
| GLYCEROL MONOSTEARATE | 4.8 | 4.7 |
| LECITHIN | 2.7 | 3.5 |
| TOTAL PERCENT | 100.0 | 100.0 |

When the wax-free gum base of the invention is to be used in a regular (non-bubble) gum which does not have abhesive characteristics, the base should preferably contain about 12 to about 30 weight percent natural elastomer, about 20 to about 40 weight percent synthetic elastomer, about 4 to about 25 weight percent elastomer plasticizer, about 5 to about 25 weight percent filler, about 15 to about 30 weight percent softener, 0 to about 0.1 weight percent colorant and 0 to about 0.1 weight percent antioxidant. By way of example, specific embodiments of the wax-free gum base fitting this description are provided in Examples 31-55 below:

TABLE 2

WAX-FREE GUM BASES FOR USE IN CHEWING GUM HAVING SOME REDUCED TACK CHARACTERISTICS (EXAMPLES 31-535)

EXAMPLES 31-34

| GENERIC INGREDIENTS | IDENTIFICATION - EXAMPLES #: | | | |
|---|---|---|---|---|
| | 31 | 32 | 33 | 34 |
| NATURAL ELASTOMER | | | | |
| NATURAL GUM | 22.0 | 26.5 | 23.4 | 25.1 |
| SYNTHETIC ELASTOMER | | | | |
| STYRENE-BUTADIENE ELASTOMER | — | — | — | 1.9 |
| BUTYL (ISOPRENE-ISOBUTYLENE) ELASTOMER | 4.8 | 7.1 | 5.6 | 2.1 |
| POLYISOBUTYLENE ELASTOMER | 5.7 | 5.6 | 3.0 | 4.7 |
| POLYVINYL ACETATE | 16.4 | 18.7 | 19.8 | 24.8 |
| ELASTOMER PLASTICIZERS | | | | |
| GLYCEROL ESTERS OF ROSIN | 3.8 | — | — | 3.2 |
| GLYCEROL ESTERS OF PART HYD ROSIN | 12.3 | 15.3 | 15.9 | 12.6 |
| METHYL ESTERS OF ROSIN | — | — | — | 2.1 |
| TERPENE RESINS | — | — | — | — |
| FILLER | | | | |
| CALCIUM CARBONATE | — | 4.0 | 10.7 | 4.4 |
| TALC | 7.1 | — | — | — |
| SOFTENER | | | | |
| HYDROGENATED VEGETABLE OIL | 21.8 | 18.4 | 16.8 | 12.6 |
| GLYCEROL MONOSTEARATE | 6.1 | 4.4 | 4.8 | 3.8 |
| LECITHIN | — | — | — | 2.7 |
| TOTAL PERCENT | 100.0 | 100.0 | 100.0 | 100.0 |

EXAMPLES 35-38

| GENERIC INGREDIENTS | IDENTIFICATION - EXAMPLES #: | | | |
|---|---|---|---|---|
| | 35 | 36 | 37 | 38 |
| NATURAL ELASTOMER | | | | |
| NATURAL GUM | 22.8 | 18.2 | 23.5 | 17.6 |
| SYNTHETIC ELASTOMER | | | | |
| STYRENE-BUTADIENE ELASTOMER | 2.6 | — | — | — |
| BUTYL (ISOPRENE-ISOBUTYLENE) ELASTOMER | 4.1 | 6.9 | 8.8 | 10.2 |
| POLYISOBUTYLENE ELASTOMER | 3.2 | 5.4 | 3.3 | 2.1 |
| POLYVINYL ACETATE | 16.3 | 15.2 | 12.9 | 26.9 |
| ELASTOMER PLASTICIZERS | | | | |
| GLYCEROL ESTERS OF ROSIN | 6.9 | — | 8.5 | 11.7 |
| GLYCEROL ESTERS OF PART HYD ROSIN | 11.8 | 12.5 | 5.5 | 4.8 |
| METHYL ESTERS OF ROSIN | 1.7 | 2.6 | 1.4 | — |
| TERPENE RESINS | — | — | 3.7 | — |
| FILLER | | | | |
| CALCIUM CARBONATE | 9.3 | 16.0 | — | — |
| TALC | — | — | 9.3 | 4.6 |
| SOFTENER | | | | |
| HYDROGENATED VEGETABLE OIL | 18.2 | 16.1 | 16.2 | 15.8 |
| GLYCEROL MONOSTEARATE | — | 7.1 | 5.7 | 6.3 |
| LECITHIN | 3.1 | — | 1.2 | — |
| TOTAL PERCENT | 100.0 | 100.0 | 100.0 | 100.0 |

EXAMPLES 39-42

| GENERIC INGREDIENTS | IDENTIFICATION - EXAMPLES #: | | | |
|---|---|---|---|---|
| | 39 | 40 | 41 | 42 |
| NATURAL ELASTOMER | | | | |
| NATURAL GUM | 12.9 | 18.5 | 15.7 | 22.6 |
| SYNTHETIC ELASTOMER | | | | |
| STYRENE-BUTADIENE ELASTOMER | — | — | 1.9 | — |
| BUTYL (ISOPRENE-ISOBUTYLENE) ELASTOMER | 9.1 | 6.4 | 3.7 | 5.8 |
| POLYISOBUTYLENE ELASTOMER | 9.4 | 5.2 | 4.1 | 3.1 |
| POLYVINYL ACETATE | 10.7 | 15.4 | 26.2 | 20.4 |
| ELASTOMER PLASTICIZERS | | | | |
| GLYCEROL ESTERS OF ROSIN | 15.2 | — | — | — |
| GLYCEROL ESTERS OF PART HYD ROSIN | — | 13.2 | 15.3 | 11.7 |
| METHYL ESTERS OF ROSIN | — | 2.0 | — | 4.0 |
| TERPENE RESINS | — | — | — | — |
| FILLER | | | | |
| CALCIUM CARBONATE | 20.6 | 18.5 | 12.2 | 11.6 |
| TALC | — | — | — | — |
| SOFTENER | | | | |
| HYDROGENATED VEGETABLE OIL | 15.8 | 13.9 | 15.1 | 17.5 |
| GLYCEROL MONOSTEARATE | 6.3 | 6.9 | 5.8 | 3.3 |
| LECITHIN | — | — | — | — |
| TOTAL PERCENT | 100.0 | 100.0 | 100.0 | 100.0 |

EXAMPLES 43-46

| GENERIC INGREDIENTS | IDENTIFICATION - EXAMPLES #: | | | |
|---|---|---|---|---|
| | 43 | 44 | 45 | 46 |
| NATURAL ELASTOMER | | | | |
| NATURAL GUM | 23.7 | 22.2 | 21.1 | 22.2 |
| SYNTHETIC ELASTOMER | | | | |
| STYRENE-BUTADIENE ELASTOMER | — | — | — | — |
| BUTYL (ISOPRENE-ISOBUTYLENE) ELASTOMER | 6.2 | 5.7 | 6.1 | 5.7 |
| POLYISOBUTYLENE ELASTOMER | 5.9 | 3.1 | 2.8 | 3.1 |
| POLYVINYL ACETATE | 23.7 | 22.0 | 18.0 | 22.0 |
| ELASTOMER PLASTICIZERS | | | | |
| GLYCEROL ESTERS OF ROSIN | — | — | 15.7 | — |
| GLYCEROL ESTERS OF PART HYD ROSIN | 11.3 | 15.2 | — | 13.2 |
| METHYL ESTERS OF ROSIN | 2.9 | — | — | 2.0 |
| TERPENE RESINS | 2.8 | — | — | — |
| FILLER | | | | |
| CALCIUM CARBONATE | 5.6 | 11.4 | — | 11.3 |
| TALC | — | — | 15.4 | — |
| SOFTENER | | | | |
| HYDROGENATED VEGETABLE OIL | 12.1 | 17.2 | 15.1 | 17.2 |
| GLYCEROL MONOSTEARATE | 5.8 | 3.3 | 5.8 | 3.3 |
| LECITHIN | — | — | — | — |
| TOTAL PERCENT | 100.0 | 100.0 | 100.0 | 100.0 |

EXAMPLES 47-50

IDENTIFICATION -

TABLE 2-continued
WAX-FREE GUM BASES FOR USE IN CHEWING GUM HAVING SOME REDUCED TACK CHARACTERISTICS (EXAMPLES 31-535)

| GENERIC INGREDIENTS | EXAMPLES #: 47 | 48 | 49 | 50 |
|---|---|---|---|---|
| NATURAL ELASTOMER | | | | |
| NATURAL GUM | 23.8 | 28.4 | 18.7 | 19.5 |
| SYNTHETIC ELASTOMER | | | | |
| STYRENE-BUTADIENE ELASTOMER | — | — | — | — |
| BUTYL (ISOPRENE-ISOBUTYLENE) ELASTOMER | 3.1 | 5.4 | 6.9 | 8.2 |
| POLYISOBUTYLENE ELASTOMER | 7.7 | 3.1 | 5.5 | 2.7 |
| POLYVINYL ACETATE | 20.5 | 26.6 | 14.8 | 17.2 |
| ELASTOMER PLASTICIZERS | | | | |
| GLYCEROL ESTERS OF ROSIN | — | — | — | 20.0 |
| GLYCEROL ESTERS OF PART HYD ROSIN | 10.4 | 11.4 | 15.5 | — |
| METHYL ESTERS OF ROSIN | 2.0 | — | — | — |
| TERPENE RESINS | 5.1 | — | — | — |
| FILLER | | | | |
| CALCIUM CARBONATE | — | 9.1 | 17.9 | 9.6 |
| TALC | 5.3 | — | — | — |
| SOFTENER | | | | |
| HYDROGENATED VEGETABLE OIL | 15.8 | 16.0 | 13.0 | 22.8 |
| GLYCEROL MONOSTEARATE | 6.3 | — | 7.7 | — |
| LECITHIN | — | — | — | — |
| TOTAL PERCENT | 100.0 | 100.0 | 100.0 | 100.0 |

EXAMPLES 51-54

| GENERIC INGREDIENTS | IDENTIFICATION - EXAMPLES #: 51 | 52 | 53 | 54 |
|---|---|---|---|---|
| NATURAL ELASTOMER | | | | |
| NATURAL GUM | 14.4 | 18.2 | 25.2 | 25.2 |
| SYNTHETIC ELASTOMER | | | | |
| STYRENE-BUTADIENE ELASTOMER | — | — | — | — |
| BUTYL (ISOPRENE-ISOBUTYLENE) ELASTOMER | 9.1 | 6.8 | 2.4 | 3.5 |
| POLYISOBUTYLENE ELASTOMER | 3.6 | 5.4 | 4.9 | 5.7 |
| POLYVINYL ACETATE | 18.1 | 15.5 | 19.9 | 19.1 |
| ELASTOMER PLASTICIZERS | | | | |
| GLYCEROL ESTERS OF ROSIN | 11.9 | — | 15.6 | — |
| GLYCEROL ESTERS OF PART HYD ROSIN | 13.0 | 12.7 | — | 15.6 |
| METHYL ESTERS OF ROSIN | — | 2.6 | — | — |
| TERPENE RESINS | — | — | 2.1 | 1.9 |
| FILLER | | | | |
| CALCIUM CARBONATE | 14.1 | 15.7 | — | — |
| TALC | — | — | 7.1 | 6.2 |
| SOFTENER | | | | |
| HYDROGENATED VEGETABLE OIL | 15.8 | 16.0 | 18.4 | 18.4 |
| GLYCEROL MONOSTEARATE | — | 7.1 | 4.4 | 4.4 |
| LECITHIN | — | — | — | — |
| TOTAL PERCENT | 100.0 | 100.0 | 100.0 | 100.0 |

EXAMPLE 55

| GENERIC INGREDIENTS | IDENTIFICATION - EXAMPLES #: 55 |
|---|---|
| NATURAL ELASTOMER | |
| NATURAL GUM | 26.7 |
| SYNTHETIC ELASTOMER | |
| STYRENE-BUTADIENE ELASTOMER | — |
| BUTYL (ISOPRENE-ISOBUTYLENE) ELASTOMER | 3.2 |
| POLYISOBUTYLENE ELASTOMER | 6.1 |
| POLYVINYL ACETATE | 17.6 |
| ELASTOMER PLASTICIZERS | |
| GLYCEROL ESTERS OF ROSIN | — |
| GLYCEROL ESTERS OF PART HYD ROSIN | 15.6 |
| METHYL ESTERS OF ROSIN | — |
| TERPENE RESINS | — |
| FILLER | |
| CALCIUM CARBONATE | — |
| TALC | 8.0 |
| SOFTENER | |
| HYDROGENATED VEGETABLE OIL | 18.4 |
| GLYCEROL MONOSTEARATE | 2.8 |
| LECITHIN | 1.6 |
| TOTAL PERCENT | 100.0 |

When the wax-free gum base of the invention is to be used in a bubble gum, the base should preferably contain about 30 to about 60 weight percent synthetic elastomer, about 5 to about 55 weight percent elastomer plasticizer, about 10 to about 35 weight percent filler, about 5 to about 25 weight percent softener, 0 to about 1 weight percent colorant and 0 to about 0.1 weight percent antioxidant. By way of examples, specific embodiments of the wax-free base for use in bubble gum are provided in Examples 56-74 below.

TABLE 3
WAX-FREE GUM BASES FOR USE IN BUBBLE GUM (EXAMPLES 56-74)

EXAMPLES 56-59

| GENERIC INGREDIENTS | IDENTIFICATION - EXAMPLES #: 56 | 57 | 58 | 59 |
|---|---|---|---|---|
| SYNTHETIC ELASTOMER | | | | |
| POLYISOBUTYLENE ELASTOMER | 17.1 | 16.7 | 11.7 | 6.2 |
| POLYVINYL ACETATE | 24.9 | 25.6 | 29.4 | 30.9 |
| ELASTOMER PLASTICIZERS | | | | |
| GLYCEROL ESTERS OF ROSIN | 6.8 | 8.0 | 10.7 | 14.6 |
| GLYCEROL ESTERS OF PART HYD ROSIN | — | — | — | — |
| FILLER | | | | |
| CALCIUM CARBONATE | — | — | — | — |
| TALC | 34.7 | 34.9 | 34.1 | 34.0 |
| SOFTENER | | | | |
| GLYCEROL TRIACETATE | 4.6 | 3.9 | 4.4 | 4.7 |
| GLYCEROL MONOSTEARATE | 5.8 | 5.7 | 4.3 | 4.6 |
| ACETYLATED MONOGLYCERIDE | 6.1 | 5.2 | 5.4 | 5.0 |
| TOTAL PERCENT | 100.0 | 100.0 | 100.0 | 100.0 |

EXAMPLES 60-63

| GENERIC INGREDIENTS | IDENTIFICATION - EXAMPLES #: 60 | 61 | 62 | 63 |
|---|---|---|---|---|
| SYNTHETIC ELASTOMER | | | | |

TABLE 3-continued
WAX-FREE GUM BASES FOR USE IN BUBBLE GUM (EXAMPLES 56–74)

| GENERIC INGREDIENTS | 60 | 61 | 62 | 63 |
|---|---|---|---|---|
| SYNTHETIC ELASTOMER | | | | |
| POLYISOBUTYLENE ELASTOMER | 11.6 | 15.7 | 13.2 | 5.4 |
| POLYVINYL ACETATE | 31.5 | 32.1 | 33.2 | 34.8 |
| ELASTOMER PLASTICIZERS | | | | |
| GLYCEROL ESTERS OF ROSIN | 19.8 | 27.4 | 22.6 | 16.3 |
| GLYCEROL ESTERS OF PART HYD ROSIN | — | — | — | — |
| FILLER | | | | |
| CALCIUM CARBONATE | — | — | — | 30.2 |
| TALC | 21.9 | 10.1 | 17.3 | — |
| SOFTENER | | | | |
| GLYCEROL TRIACETATE | 5.0 | 4.9 | 5.0 | 5.3 |
| GLYCEROL MONOSTEARATE | 4.9 | 4.7 | 4.1 | 5.9 |
| ACETYLATED MONOGLYCERIDE | 5.3 | 5.1 | 4.6 | 2.1 |
| TOTAL PERCENT | 100.0 | 100.0 | 100.0 | 100.0 |

EXAMPLES 64–67

| GENERIC INGREDIENTS | 64 | 65 | 66 | 67 |
|---|---|---|---|---|
| SYNTHETIC ELASTOMER | | | | |
| POLYISOBUTYLENE ELASTOMER | 7.9 | 17.2 | 13.0 | 11.6 |
| POLYVINYL ACETATE | 34.2 | 37.3 | 37.1 | 39.9 |
| ELASTOMER PLASTICIZERS | | | | |
| GLYCEROL ESTERS OF ROSIN | 14.8 | 11.2 | — | — |
| GLYCEROL ESTERS OF PART HYD ROSIN | — | — | 19.8 | 19.9 |
| FILLER | | | | |
| CALCIUM CARBONATE | 29.8 | 20.6 | 16.5 | 15.0 |
| TALC | — | — | — | — |
| SOFTENER | | | | |
| GLYCEROL TRIACETATE | 5.3 | 5.6 | 5.6 | 6.0 |
| GLYCEROL MONOSTEARATE | 5.0 | 8.1 | 8.0 | 7.6 |
| ACETYLATED MONOGLYCERIDE | 3.0 | — | — | — |
| TOTAL PERCENT | 100.0 | 100.0 | 100.0 | 100.0 |

EXAMPLES 68–71

| GENERIC INGREDIENTS | 68 | 69 | 70 | 71 |
|---|---|---|---|---|
| SYNTHETIC ELASTOMER | | | | |
| POLYISOBUTYLENE ELASTOMER | 11.6 | 7.9 | 11.6 | 10.9 |
| POLYVINYL ACETATE | 41.2 | 34.2 | 37.8 | 37.5 |
| ELASTOMER PLASTICIZERS | | | | |
| GLYCEROL ESTERS OF ROSIN | — | — | — | — |
| GLYCEROL ESTERS OF PART HYD ROSIN | 19.4 | 14.8 | 19.8 | 20.6 |
| FILLER | | | | |
| CALCIUM CARBONATE | — | 29.8 | — | — |
| TALC | 14.0 | — | 17.0 | 19.5 |
| SOFTENER | | | | |
| GLYCEROL TRIACETATE | 6.2 | 5.3 | 5.6 | 5.2 |
| GLYCEROL MONOSTEARATE | 7.6 | 5.0 | 3.2 | 3.1 |
| ACETYLATED MONOGLYCERIDE | — | 3.0 | 5.0 | 3.2 |
| TOTAL PERCENT | 100.0 | 100.0 | 100.0 | 100.0 |

EXAMPLES 72–74

| GENERIC INGREDIENTS | 72 | 73 | 74 |
|---|---|---|---|
| SYNTHETIC ELASTOMER | | | |
| POLYISOBUTYLENE ELASTOMER | 11.6 | 12.4 | 11.9 |
| POLYVINYL ACETATE | 31.4 | 31.0 | 37.0 |
| ELASTOMER PLASTICIZERS | | | |
| GLYCEROL ESTERS OF ROSIN | — | — | — |
| GLYCEROL ESTERS OF PART HYD ROSIN | 19.8 | 21.1 | 20.3 |
| FILLER | | | |
| CALCIUM CARBONATE | — | — | — |
| TALC | 22.7 | 22.2 | 16.7 |
| SOFTENER | | | |
| GLYCEROL TRIACETATE | 5.8 | 4.3 | 5.7 |
| GLYCEROL MONOSTEARATE | 2.9 | 2.5 | 4.5 |
| ACETYLATED MONOGLYCERIDE | 5.8 | 6.5 | 3.9 |
| TOTAL PERCENT | 100.0 | 100.0 | 100.0 |

Pursuant to the present invention, the wax-free gum bases preferably constitute approximately 70 to about 97 weight percent of the low calorie, high base chewing gum. The gum base is typically prepared by adding an amount of the elastomer, elastomer plasticizers and filler to a heated sigma blade mixer with a front to rear blade speed ratio of typically 2:1. The initial amounts of ingredients are determined by the working capacity of the mixing kettle in order to attain a proper consistency. After the initial ingredients have massed homogeneously, the balance of the elastomer plasticizers, fillers, softeners, etc. are added in a sequential manner until a completely homogeneous molten mass is attained. This can usually be achieved in one to four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

Although the above method for making gum base is typical and applies to both chewing and bubble bases, it has been found that there is a preferred method for making the bubble bases described in this invention.

First, all of the polyvinyl acetate and portions of the polyisobutylene and filler are added and blended in a heated sigma blade mixer. Softeners such as glyceryl triacetate and/or acetylated monoglyceride are then added along with a second portion of each of polyisobutylene and filler. The acetylated monoglyceride may be added at the end of the process if desired and still not alter the chewing texture of the gum made from the base.

Next, the rest of the polyisobutylene and filler are added along with the elastomer plasticizer. Finally, the remaining ingredients such as glycerol monostearate and antioxidants may be added. Colorant may be added at any time during the mixing process and is preferably added at the start.

There are some variations to the above described preferred method which in no way limit the method as described. Those skilled in the art of gum base manufacture may be able to appreciate any minor variations.

In producing wax-containing gum bases high in polyvinyl acetate, and particularly those high in high molecular weight polyvinyl acetate, it is necessary to improve blending of the ingredients by removing the heat applied to the sigma blade mixer at some point in the process. This reduces the temperature of the gum base and causes greater compatibility of its ingredients. In the gum base process for making the gum base free of wax, there is no need to remove the heat applied. The degree of incompatibility is greatly reduced since there is no wax present.

In addition to a water-insoluble gum base, a typical chewing gum composition includes a water soluble bulk portion and one or more flavoring agents. Pursuant to the present invention, the bulking agent is substantially reduced or eliminated in the chewing gum composition. The balance of the product will be composed of flavor, artificial sweeteners (both free and encapsulated), softeners, emulsifiers, colors, acidulants, fillers, antioxidants, and other components that provide desired attributes. In cases where the gum base level consists of less than 90% by weight of the chewing gum composition, it may be necessary to include bulking agents. Such bulking agents are typically sugars or sugar alcohols which provide some sweetness to the product. However, since such materials are caloric, they should be incorporated at the minimum level necessary to meet sensory and/or product cost targets.

Preferably, when a bulking agent is used, a low-caloric bulking agent will be used. Examples of low-caloric bulking agents include: polydextrose; Raftilose; Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

The use of low-calorie bulking agents, in those situations wherein a bulking agent is used, will minimize the added calories in the finished product. In any event, the bulking agent pursuant to the present invention will be less than 30% by weight of the chewing gum composition.

Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

To produce the desired level of sweetness, artificial sweeteners will generally be used. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Pursuant to the present invention, the amount of flavoring agents required, as compared to typical low calorie, high base chewing gums will be less. Typical chewing gums that include wax containing gum bases, contain approximately 4 to about 10% flavor based on the weight of gum base.

Because, pursuant to the present invention, wax is not used, or is substantially reduced, in the gum bases used to make the low calorie, high base chewing gum of the present invention, flavor levels can be substantially reduced and the chewing gum can deliver the same flavor to the chewer. Pursuant to the present invention, the low calorie, high base chewing gums need to contain only approximately 2 to about 7% flavor based on the weight of the gum base. Because, preferably, the gum base will comprise 70 to 97% of the gum, the flavor will therefore, preferably, comprise 1.4% to 6.5% of the chewing gum composition by weight.

Therefore, for a chewing gum comprising 80% gum base, constructed pursuant to the present invention, the flavor content would only comprise 1.6% to 5.6% of the total chewing gum composition. In contrast, a high base chewing gum comprising 80% of a typical wax containing gum base would need to include approximately 3.2 to about 8% flavor.

The amount of flavor used may be further reduced by incorporating the flavor in a spray dried or fast release form. Spray dried flavor will deliver 2–4 times the flavor impact of the same flavor in neat form.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulking agent, if a bulking agent is used. Further parts of the bulking agent, if used, may then be added to the mixer. Flavoring agents are typically then added. The entire mixing process typically takes from five to fifteen minutes, although longer mixing times are sometimes required. Those skilled in the art will recognize that variations of this mixing procedure, or other mixing procedures, may be followed.

Pursuant to the present invention, methods are provided for eliminating the wax from a gum base yet still providing a gum base that yields a gum having desirable characteristics. Of course, a great number of gum bases are known, many of which have been, or are, commercial products. The inventor believes that the great majority of these bases are wax containing. Indeed, it is further believed that there are only a few specialized formulas that do not contain wax; these formulas having been modified to achieve certain properties at the expense of certain desirable properties that are typically present in a wax containing gum and therefore do not provide a wax-free gum base that can be used to create a gum having characteristics as good as or better than a gum including wax. It would therefore be desirable to provide a method for creating a wax-free product in those situations where public perception or regulatory requirements make a wax-free base necessary and/or desirable.

One method for eliminating wax from a gum base is to eliminate the wax from the typical formula and increase the proportion of at least select oils in the base sufficiently to compensate for the removal of the wax. It is not necessary for a one to one correspondence to be made with respect to the amount of wax deleted and the proportion of oil increased. Rather, in order to afford the necessary characteristics to the resultant gum, the amount and type of oils chosen are selected to create a composition that has chew characteristics, including flavor release, as good as a wax based gum.

More specifically, in an embodiment of the method and composition of the present invention, the amount of and the capillary melting point (CMP) of the oil component are chosen so that the resultant no wax gum base has a softening point lower than that of a corresponding wax containing gum base. The softening point of the base is determined by using ASTM method E28-58T modified whereby the gum base sample is softened in an oven and molded into a shouldered brass ring and trimmed. The sample is placed in a water and glycerine bath and adjusted to a temperature rise of 1° C.±0.25° C. per minute.

By so choosing the oils and reducing the softening point of the base, this provides for a better release of the flavors. It has been found that preferably the oils have a CMP of approximately 40° C. to about 70° C. Preferably, the oils comprise substantially hydrogenated oils. Preferred hydrogenated oils include cottonseed oil (60°–65° C.) and soybean oil (65°–70° C.). However, other oils can also be used such as canola, safflower, sunflower, palm, and coconut. It has been found that preferably when hydrogenated oils are used, the oils comprise at least 12% by weight of the gum base.

Partially hydrogenated oils can be used in conjunction with the hydrogenated oils. Preferably, the partially hydrogenated oils have melting points of 45°–50° C. In an embodiment, preferably the partially hydrogenated oils are used at 10% or less with respect to the total content of the base.

As used herein, the term "oil" is used broadly and includes hydrogenated oils and those products that technically may be classified as fats.

It should be noted that although the addition of "fats" may appear undesirable in a low calorie chewing gum product, this is not the case. Little, if any, of the fatty material is extracted from the gum during chewing. Therefore, the "fats" contribute essentially no extractable calories to the product.

The selection of the elastomer plasticizer can contribute and improve the characteristics of a gum base product when the wax is removed. In this regard, the ring and ball softening points (R&B SP) of the elastomer plasticizer may also be important with respect to a no wax product. Preferably, in an embodiment of the no wax gum base of the present invention, the elastomer plasticizer has a R&B SP of about 60° C. to about 135° C. Such elastomer plasticizers include: dimerized rosin ester (80°–130° C.); glycerol ester of rosin (80°–90° C.); glycerol ester of partially hydrogenated rosin (75°–90° C.); and terpene resin (80°–130° C.).

A method is provided for removing the wax from a typical wax containing gum base formula. To this end, in an embodiment, when the gum base from which the wax is to be removed originally contains approximately 5% or less wax, in the initial step in the process, the wax is removed from the formula and the other components are increased proportionately. It is not necessary that each component be increased, or that each component be increased to the exact same extent. Rather, at least the majority of the components are increased, and preferably proportionately.

After the reformulation of the gum base, the resultant gum base is then tested. To this end, the gum base can be tested to determine its physical properties, e.g., theology, to determine if those properties are at least substantially similar to the original wax containing gum base. If desired, the gum base can be used to create a chewing gum. The chewing gum can then be tested to determine if it has chew characteristics that are sufficiently close to, if not better, than a control (a gum created from the original gum base containing wax).

If it is found that the resultant gum does not have sufficiently good chew characteristics, or if the physical properties of the gum base are not satisfactory, then the percent of oil in the gum base is modified. In an embodiment, the percent of oil is not initially modified, but rather, the melting point of the oil is modified. For example, the melting point is increased by adding oils that have a higher melting point and reducing the oils that have a lower melting point. Again, the resultant gum base is tested or a chewing gum is created from the base and the chew characteristics of the gum are tested.

If the gum base, or the chew characteristics of the gum, are still not satisfactory, then further modifications can be made to the percent of oil and/or the melting point of the oil in the gum base. As a further step, the melting point of the elastomer plasticizer in the wax-free base can be modified. It has been found that the melting point of the elastomer plasticizer in the gum base contributes to the chew characteristics. Utilizing these steps, one should be able to eliminate the wax from a gum base without compromising the chew characteristics.

If the gum base originally contains approximately 5% or greater wax content, then the initial step in the process is preferably to eliminate the wax and to increase the oil content proportionately. As previously stated, it is not necessary that the oils be increased in a proportion that corresponds exactly to the original wax content. Rather, the oils are at least increased so as to substantially make up for the elimination of the wax portion. The resultant gum base is then either tested or can then be used to create a chewing gum that is then compared to the control to determine its chew characteristics.

If the characteristics of the resultant gum base are not satisfactory, then the melting point of the oil is modified slightly. Again, to achieve an increase in the melting point in the oil, the oils having a higher melting point, for example, soybean, are increased and the oils having a lower melting point, for example, cotton-seed oil, are reduced.

The gum base is again tested. If it is found that the gum base does not provide satisfactory characteristics, then the melting point of the oil can be further modified.

As an alternative, the proportion of the oil contained in the base can be modified.

If a satisfactory chewing gum base is not created through the step of modifying the melting point of the oil, then the melting point of the elastomer plasticizer is modified.

By using this method, wax can be removed from a gum base that originally contains approximately 5% or greater wax and a wax-free gum base can be created that can be used to make a chewing gum having chew characteristics as good as, if not better than, a gum created from a gum base containing wax.

By way of example, and not limitation, examples of wax containing gum bases (controls) are compared to no wax bases that were reformulated from the control formulas pursuant to the present invention will now be given:

| I. CHEWING GUMS EXAMPLES 75-90 | | | | |
|---|---|---|---|---|
| Type: | 75 | 76 | 77 Control | 78 78 |
| Elastomer | 18.5 | 18.5 | 15.5 | 11.7 |
| PVAc | 13.1 | 13.1 | 13.1 | 27.3 |
| Elastomer Plasticizer | 19.9 | 19.9 | 19.9 | 26.9 |
| Wax | — | — | 19.7 | — |
| Hyd. Veg. Oil | 13.8 | 13.8 | 6.3 | 14.3 |
| Softening Point | 57° C. | 57° C. | 80° C. | 56° C. |
| Type: | 79 Control | 80 | 81 Control | 82 82 |
| Elastomer | 11.7 | 12.3 | 12.6 | 11.1 |
| PVAc | 27.3 | 27.4 | 27.4 | 27.4 |
| Elastomer Plasticizer | 26.9 | 27.4 | 25.9 | 27.4 |
| Hyd. Veg. Oil | 2.0 | 12.3 | 3.2 | 13.6 |
| Wax | 13.3 | — | 12.4 | — |
| Softening Point | 70° C. | 60° C. | 73° C. | 53° C. |
| Type: | 83 | 84 Control | 85 | 86 Control |
| Elastomer | 18.9 | 18.7 | 16.7 | 16.7 |
| PVAc | 21.3 | 21.5 | 15.3 | 15.2 |
| Elastomer Plasticizer | 9.7 | 9.6 | 19.0 | 19.1 |
| Hyd. Veg. Oil | 23.2 | 19.5 | 21.4 | 14.3 |
| Wax | — | 4.3 | — | 10.0 |
| Softening Point | 57° C. | 63° C. | 59° C. | 67° C. |
| Type: | 87 | 88 Control | 89 | 90 |
| Elastomer | 11.9 | 11.9 | 11.7 | 26.0 |
| PVAc | 27.5 | 27.6 | 27.3 | 21.7 |
| Elastomer Plasticizer | 25.3 | 25.3 | 26.9 | — |
| Wax | — | 14.4 | — | — |
| Hyd. Veg. Oil | 15.5 | 2.0 | 14.2 | 36.4 |
| Softening Point | 57° C. | 65° C. | 59° C. | 64° C. |
| EXAMPLES 91-98 | | | | |
| Type: | 91 | 92 Control | 93 | 94 Control |
| Elastomer | 28.8 | 31.3 | 30.3 | 30.5 |
| PVAc | 22.0 | 22.4 | 15.5 | 15.6 |
| Elastomer Plasticizer | — | 13.7 | 15.2 | 14.7 |
| Hyd. Veg. Oil | 17.2 | 4.7 | 16.0 | 5.7 |
| Wax | — | 12.9 | — | 11.9 |
| Softening Point | 53° C. | 58° C. | 51° C. | 56° C. |
| Type: | 95 | 96 Control | 97 | 98 Control |
| Elastomer | 36.87 | 36.9 | 30.2 | 30.9 |
| PVAc | 26.64 | 26.6 | 15.4 | 15.7 |

-continued

| | | | | |
|---|---|---|---|---|
| Elastomer Plasticizer | 11.41 | 11.4 | 15.2 | 13.3 |
| Hyd. Veg. Oil | 16.0 | 5.9 | 13.5 | 5.9 |
| Wax | — | 10.2 | — | 10.3 |
| Softening Point | 58° C. | 77° C. | 56° C. | 65° C. |

| BUBBLE GUMS EXAMPLES 99-105 | | | | |
|---|---|---|---|---|
| Type: | 99 | 100 Control | 101 | 102 Control |
| Elastomer | 7.9 | 7.0 | 11.9 | 10.8 |
| PVAc | 34.2 | 31.3 | 37.0 | 35.3 |
| Elastomer Plasticizer | 14.8 | 13.1 | 20.3 | 18.5 |
| Softener | 13.3 | 10.6 | 14.1 | 12.8 |
| Wax | — | 13.0 | — | 6.5 |
| Softening Point | 50° C. | 56° C. | 57° C. | 62° C. |
| Type: | 103 | 104 | 105 Control | |
| Elastomer | 11.6 | 11.6 | 10.8 | |
| PVAc | 31.4 | 31.4 | 31.3 | |
| Elastomer Plasticizer | 19.8 | 19.8 | 18.5 | |
| Softener | 13.7 | 14.5 | 12.3 | |
| Wax | — | — | 6.5 | |
| Softening Point | 53° C. | 53° C. | 59° C. | |

It has been found that with at least some current commercial bases, the wax can be removed without compromising the chew characteristics of a resultant gum product by, at least in part, increasing the oils and creating a base having a softening point that is lower than the softening point of a corresponding wax containing gum base. Preferably, the no wax gum base has a softening point that is at least 5° C. lower than the gum base if it had included wax. In a preferred embodiment, the softening point is 10° C. lower.

By way of example, and not limitation, taste results of gum created from commercial gum bases that have wax vis-a-vis chewing gum, created from gum bases that do not include wax pursuant to the present invention will now be given.

The testing was performed using a blind study protocol. One hundred fifty participants were used in each of the three studies. Fifty percent of the participants in each study had chewed the commercial (control) product as their regular preferred gum before the study and 50% of the participants had chewed the control gum at least once during the preceding week before the study.

During the study, each participant was given one of the two gum products to chew for 12 minutes. This was followed by a cleansing period of 6 minutes. The second product was then chewed for 12 minutes. During the study, half of the participants were given the control first and half the new product. The participants were asked for their preferences based on a number of criteria.

The results were as follows:

EXAMPLE NO. 1A

In this example, the control chewing gum comprised: 25.2% of a gum base with wax; 48.45% sorbitol; 16.80% glycerine; 8.01 mannitol; 1.33% flavor; and 0.21% encapsulated aspartame.

The no wax chewing gum comprised: 25.2% of the gum base of the control modified pursuant to the present invention; 48.45% sorbitol; 16.80% glycerine; 8.01% mannitol; 1.33% flavor; and 0.21% encapsulated aspartame.

| PREFERENCES | | |
|---|---|---|
| | Prefer No Wax % | Prefer Wax % |
| Overall Preference | 52 | 47 |
| Tastes Best | 52 | 46 |
| More Refreshing | 50 | 46 |
| Chewing Texture | 50 | 47 |
| Refreshing Breath | 55 | 40 |
| Long Lasting Taste | 52 | 41 |
| Better Spearmint Flavor | 49 | 48 |
| Better Appearance | 36 | 44 |
| Sweeter | 54 | 40 |
| Less Bitter | 44 | 45 |
| Softer | 79 | 16 |
| Better Smell | 38 | 51 |
| Stronger Flavor | 57 | 42 |
| Stuck More To Teeth | 31 | 31 |
| Rather Buy | 52 | 44 |

| | No Wax | Wax |
|---|---|---|
| FLAVOR OVERALL (1 MINUTE) "Excellent" | 23% | 21% |
| STRENGTH OF FLAVOR (1 MINUTE) "About Right" | 70% | 70% |
| FLAVOR OVERALL (12 MINUTES) "Excellent" | 9% | 7% |
| STRENGTH OF FLAVOR (12 MINUTES) "About Right" | 51% | 56% |

EXAMPLE No. 2A

In this example, the control chewing gum comprised: 25.16% base with wax; 48.38% sorbitol; 8.00% mannitol; 16.66% glycerine; 1.55% flavor; and 0.25% encapsulated aspartame.

The no wax chewing gum comprised: 25.16% of the base of the control modified pursuant to the present invention; 48.28% sorbitol; 8.00% mannitol; 16.66% glycerine; 1.65% flavor; and 0.25% encapsulated aspartame.

| PREFERENCES | | |
|---|---|---|
| | Prefer No Wax % | Prefer Wax % |
| Overall Preference | 49 | 47 |
| Tastes Best | 47 | 50 |
| More Refreshing | 49 | 46 |
| Chewing Texture | 46 | 51 |
| Refreshing Breath | 46 | 48 |
| Long Lasting Taste | 47 | 49 |
| Better Spearmint Flavor | 50 | 46 |
| Better Appearance | 39 | 39 |
| Sweeter | 44 | 47 |
| Less Bitter | 37 | 47 |
| Softer | 72 | 24 |
| Better Smell | 50 | 43 |
| Stronger Flavor | 53 | 44 |
| Stuck More To Teeth | 13 | 37 |
| Rather Buy | 48 | 48 |

| | No Wax | Wax |
|---|---|---|
| FLAVOR OVERALL (1 MINUTE) "Excellent" | 22% | 17% |
| STRENGTH OF FLAVOR (1 MINUTE) "About Right" | 64% | 65% |
| FLAVOR OVERALL (12 MINUTES) "Excellent" | 11% | 7% |
| STRENGTH OF FLAVOR (12 MINUTES) "About Right" | 48% | 47% |

EXAMPLE No. 3A

In this example, the control comprised: 20.6% base with wax; 57.63% sugar; 20.39% corn syrup; 0.83% glycerine; and 0.55% flavor. The no wax chewing gum comprised: 20.6% of the base of the control modified pursuant to the invention; 59.49% sugar; 18.5% corn syrup; 0.83% glycerine; and 0.58% flavor.

| PREFERENCES | | |
|---|---|---|
| | Prefer No Wax % | Prefer Wax % |
| Overall Preference | 56 | 43 |
| Tastes Best | 53 | 44 |
| More Refreshing | 51 | 48 |
| Chewing Texture | 48 | 48 |
| Refreshing Breath | 51 | 45 |
| Long Lasting Taste | 50 | 46 |
| Better Spearmint Flavor | 46 | 51 |
| Better Appearance | 45 | 38 |
| Sweeter | 40 | 55 |
| Less Bitter | 46 | 43 |
| Softer | 43 | 52 |
| Better Smell | 46 | 45 |
| Stronger Flavor | 46 | 52 |
| Stuck More To Teeth | 26 | 32 |
| Rather Buy | 51 | 45 |

| EXAMPLE NO. 3A | | |
|---|---|---|
| | No Wax | Wax |
| FLAVOR OVERALL (1 MINUTE) "Excellent" | 21% | 21% |
| STRENGTH OF FLAVOR (1 MINUTE) "About Right" | 71% | 68% |
| FLAVOR OVERALL (12 MINUTES) "Excellent" | 7% | 6% |
| STRENGTH OF FLAVOR (12 MINUTES) "About Right" | 45% | 38% |

Pursuant to the present invention, any of the gum bases disclosed herein, as well as gum bases based on the inventions disclosed herein can be used to create a low calorie, high base chewing gum. However, by way of example and not limitation, contemplative examples of low calorie, high base chewing gums of the present invention will now be given.

| BASE FORMULAS | |
|---|---|
| | % |
| Example No. 1B (Wax-Free) | |
| Polyvinylacetate | 75.00 |
| Polyisobutylene | 20.00 |
| Glycerol Triacetate | 5.00 |
| | 100.00 |
| Example No. 2B (Wax-Free) | |
| Butyl Rubber | 6.90 |
| Calcium Carbonate | 8.93 |
| Polyisobutylene | 11.05 |
| Polyvinylacetate | 25.75 |
| Hydrogenated Vegetable Oil | 42.26 |
| Glycerol Monostearate | 5.02 |
| BHA or BHT | 0.09 |
| | 100.00 |
| Example No. 3B (Wax-Free) | |
| Natural Gum | 18.16 |
| Butyl Rubber | 6.80 |
| Polyisobutylene | 5.40 |
| Polyvinylacetate | 15.50 |
| Glycerol Esters of Partially Hydrogenated Rosin | 12.70 |
| Methyl Esters of Rosin | 2.60 |
| Calcium Carbonate | 15.70 |
| Hydrogenated Vegetable Oil | 16.00 |

BASE FORMULAS

| | % |
|---|---|
| Glycerol Monostearate | 7.10 |
| BHA | 0.04 |
| | 100.00 |
| Example No. 4B (Wax-Free) | |
| Butyl Rubber | 9.97 |
| Polyisobutylene | 15.95 |
| Polyvinylacetate | 21.67 |
| Calcium Carbonate | 13.29 |
| Fat/Oil | 36.42 |
| Glycerol Monostearate | 2.66 |
| BHA | 0.04 |
| | 100.00 |
| Example No. 5B (Wax-Free) (Comparative, Wax Containing) | |
| Natural Gum | 28.42 |
| Butyl Rubber | 5.45 |
| Polyisobutylene | 3.19 |
| Polyvinylacetate | 26.56 |
| Calcium Carbonate | 9.03 |
| Ester Gum | 11.42 |
| Wax | 10.09 |
| Fat/Oil | 5.84 |
| | 100.00 |

Low Calorie, High Base Chewing Gums

| Example 1C | |
|---|---|
| Base (Example No. 1B) | 83.63 |
| Glycerin | 12.56 |
| Flavor (Peppermint) | 3.31 |
| Green Color Dispersion | 0.10 |
| Encapsulated Aspartame | 0.40 |
| | 100.00 |

The low calorie, high base chewing gum of Example 1C will have high flavor impact, good sweetness level and lasting flavor. The chewing gum will only have about one-fifth the calories of a conventional sugarless gum.

| Example 2C | % |
|---|---|
| Base (Example No. 2B) | 93.47 |
| Flavor (Sweet Fruit) | 6.03 |
| Encapsulated Aspartame | 0.50 |
| | 100.00 |

The low calorie, high base chewing gum of Example 2C will have a strong flavor impact with essentially no extractable calories.

| Example 3C | % |
|---|---|
| Base (Example No. 3B) | 76.00 |
| Sorbitol | 14.90 |
| Glycerin | 5.00 |
| Flavor (Spearmint) | 3.60 |
| Encapsulated Sucralose | 0.50 |
| | 100.00 |

The low calorie, high base chewing gum of Example 3C has a small amount of sorbitol added to improve texture. While sorbitol will add some caloric value to the product, it will still carry only about one-third of the calories of a conventional gum.

| Example 4C | % |
|---|---|
| Base (Example No. 3B) | 76.00 |
| Fructooligosaccharide (NutraFlora) | 14.90 |
| Glycerin | 5.00 |
| Flavor (Spearmint) | 3.60 |
| Encapsulated Sucralose | 0.50 |
| | 100.00 |

The gum of Example 4C is similar to that of Example 3C. However, the use of NutraFlora, a product of Zea-Gen (Broomfield, Colo.) reduces the caloric value by about 50%.

| | % |
|---|---|
| Example 5C | |
| Base (Example No. 4B) | 91.07 |
| Glycerin | 5.00 |
| Flavor (Peppermint) | 3.50 |
| Encapsulated Alitame | 0.40 |
| Free Alitame | 0.03 |
| | 100.00 |
| Example 6C (Comparative) | |
| Base (Example No. 5B) | 91.07 |
| Glycerin | 5.00 |
| Flavor (Peppermint) | 3.50 |
| Encapsulated Alitame | 0.40 |
| Free Alitame | 0.03 |
| | 100.00 |

Example 6C, a control, includes a wax containing gum base. It is believed, when Examples 5C and 6C are compared in a sensory test, the gum of Example 5C will be found to have a higher flavor impact. In practice, the flavor level in Example 6C would have to be increased to match the flavor impact of Example 5C; the wax in the gum base will bind with at least some of the flavor preventing its release to the chewer. Alternatively, if a lower flavor impact is desired, the flavor level of Example 5C could be reduced. In either case, the product of Example 5C would be less expensive to produce compared to the product of Example 6C.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A low calorie, high base chewing gum comprising:
   at least 70% by weight of a wax-free gum base;
   less than 30% by weight of a bulking agent; and
   less than or equal to 7%, by weight of the gum base, of a flavor.

2. The low calorie, high base chewing gum of claim 1 including an artificial sweetener chosen from the group consisting of:
   sucralose; aspartame; salts of acesulfame; alitame; saccharin; salts of saccharin; cyclamic acid; salts of cyclamic acid; glycyrrhizin; dihydrochalcones; thaumatin; monellin; and mixtures thereof.

3. The low calorie, high base chewing gum of claim 1 including 0.02 to about 8% by weight artificial sweetener.

4. The low calorie, high base chewing gum of claim 1 wherein the gum is sugarless.

5. The low calorie, high base chewing gum of claim 1 wherein at least a portion of the flavor is incorporated in a spray dried form.

6. The low calorie, high base chewing gum of claim 1 including an encapsulated artificial sweetener.

7. The low calorie, high base chewing gum of claim 1 wherein the chewing gum includes no bulking agent.

8. The low calorie, high base chewing gum of claim 1 wherein the bulking agent is a low calorie bulking agent.

9. The low calorie, high base chewing gum of claim 1 wherein the bulking agent is chosen from the group consisting of:

polydextrose; raftilose; raftilin; fructooligosaccharides; palatinose; oligosaccharide; guar gum hydrolysate; indigestible dextrin; and mixtures thereof.

10. The low calorie, high base chewing gum of claim 1 wherein the flavor is chosen from the group of natural flavors derived from the group consisting of: citrus oils; fruit essences; peppermint oil; spearmint oil; mint oils; clove oil; oil of wintergreen; anise; and mixtures of thereof.

11. The low calorie, high base chewing gum of claim 1 wherein the flavor includes artificial flavor.

12. The low calorie, high base chewing gum of claim 1 including both natural and artificial flavors.

13. The low calorie, high base chewing gum of claim 1 wherein the gum includes additional agents chosen from the group consisting of: softeners; emulsifiers; color agents; acidulants; fillers; and antioxidants.

14. The low calorie, high base chewing gum of claim 1 including sorbitol.

15. A method for creating a low calorie, high base chewing gum having reduced flavoring agents and comprising the steps of:

providing a gum base that is substantially free of wax; and creating a low calorie chewing gum comprising a majority of its composition as the gum base and having reduced flavoring agents as compared to a low calorie chewing gum having a similar proportion of gum base created from a wax containing base, while still providing the same flavor characteristics to the chewer.

16. The method of claim 15 including the step of adding an artificial sweetener chosen from the group consisting of: sucralose; aspartame; salts of acesulfame; alitame; saccharin; salts of saccharin; cyclamic acid; salts of cyclamic acid; glycyrrhizin; dihydrochalcones; thaumatin; monellin; and mixtures thereof.

17. The method of claim 15 wherein the flavor agent comprises, as compared to the base, less than or equal to 7 weight percent.

18. The method of claim 15 comprising the step of incorporating the flavor in a spray dried form.

19. The method of claim 15 including adding an encapsulated artificial sweetener.

20. The method of claim 15 wherein the gum base comprises at least 70% by weight of the chewing gum.

21. The method of claim 15 wherein the low calorie, high base chewing gum includes no bulking agent.

22. The method of claim 15 including the addition of a low calorie bulking agent.

23. The method of claim 22 wherein the bulking agent is chosen from the group consisting of:

polydextrose; raftilose; raftilin; fructooligosaccharides; palatinose; oligosaccharide; guar gum hydrolysate; indigestible dextrin; and mixtures thereof.

24. The method of claim 15 wherein the flavor is chosen from the group of natural flavors derived from the group consisting of: citrus oils; fruit essences; peppermint oil; spearmint oil; mint oils; clove oil; oil of wintergreen; anise; and mixtures thereof.

25. The low calorie, high base chewing gum of claim 15 wherein the flavoring agents include artificial flavor.

26. The low calorie, high base chewing gum of claim 15 including both natural and artificial flavoring agents.

27. A low calorie, high base chewing gum comprising:

at least a majority of the chewing gum comprising a wax-free base having an elastomer, polyvinyl acetate, an elastomer plasticizer, and a sufficient amount of oil having a capillary melting point between 40° C. and 70° C. to achieve flavor release characteristics that are at least as good as a similar gum base that includes wax;

less than 7% by weight flavor; and less than 30% by weight bulking agent.

28. The low calorie, high base chewing gum of claim 27 wherein at least a majority of the oil in the base is hydrogenated.

29. The low calorie, high base chewing gum of claim 27 wherein the base comprises at least 12% oil.

30. The low calorie, high base chewing gum of claim 27 wherein the base comprises:

about 20 to about 60 weight percent synthetic elastomer;

0 to about 30 weight percent natural elastomer;

about 5 to about 55 weight percent elastomer plasticizer;

about 4 to about 35 weight percent filler;

about 12 to about 35 weight percent softener.

31. The low calorie, high base chewing gum of claim 27 including 0.02 to about 8% by weight artificial sweetener.

32. The low calorie, high base chewing gum of claim 27 wherein the chewing gum includes no bulking agent.

33. The low calorie, high base chewing gum of claim 27 wherein the bulking agent is a low calorie bulking agent.

34. The low calorie, high base chewing gum of claim 27 wherein the bulking agent is chosen from the group consisting of:

polydextrose; raftilose; raftilin; fructooligosaccharides; palatinose; oligosaccharide; guar gum hydrolysate; indigestible dextrin; and mixtures thereof.

35. The low calorie, high base chewing gum of claim 27 wherein the flavor is chosen from the group of natural flavors derived from the group consisting of: citrus oils; fruit essences; peppermint oil; spearmint oil; mint oils; clove oil; oil of wintergreen; anise; and mixtures thereof.

36. The low calorie, high base chewing gum of claim 27 wherein the gum base comprises at least 70% by weight of the chewing gum.

37. The low calorie, high base chewing gum of claim 27 wherein the gum includes at least one agent chosen from the group consisting of: softeners; emulsifiers; color agents; acidulants; fillers; and antioxidants.

38. A low calorie, high base chewing gum having a reduced level of flavoring agent as compared to similar chewing gum including wax comprising:

less than 30% by weight of a bulking agent;

an artificial sweetener;
one or more flavoring agents;
a water insoluble gum base comprising: an elastomer; an elastomer plasticizer; polyvinyl acetate; and a softener wherein the softening point of the gum base is at least 5° C. less than a similar gum base having wax.

39. The low calorie, high base chewing gum of claim 38 wherein the chewing gum includes no bulking agent.

40. The low calorie, high base chewing gum of claim 38 wherein the bulking agent is a low calorie bulking agent.

41. The low calorie, high base chewing gum of claim 38 wherein the bulking agent is chosen from the group consisting of:
polydextrose; raftilose; raftilin; fructooligosaccharides; palatinose; oligosaccharide; guar gum hydrolysate; indigestible dextrin; and mixtures thereof.

42. The low calorie, high base chewing gum of claim 38 wherein the flavor is a natural flavor derived from the group consisting of: citrus oils; fruit essences; peppermint oil; spearmint oil; mint oils; clove oil; oil of wintergreen; anise; and mixtures thereof.

43. The low calorie, high base chewing gum of claim 38 including an artificial sweetener chosen from the group consisting of:
sucralose; aspartame; salts of acesulfame; alitame; saccharin; salts of saccharin; cyclamic acid; salts of cyclamic acid; glycyrrhizin; dihydrochalcones; thaumatin; monellin; and mixtures thereof.

44. The low calorie, high base chewing gum of claim 38 including an encapsulated artificial sweetener.

45. The low calorie, high base chewing gum of claim 38 wherein the flavoring agents comprise less than 7% by weight of the chewing gum.

46. The low calorie, high base chewing gum of claim 38 wherein the gum base comprises at least 70% by weight of the chewing gum.

47. A method for creating a low calorie, high base chewing gum comprising the steps of:
creating a gum base from at least an elastomer, an elastomer plasticizer, polyvinyl acetate, and oil;
choosing the percent and type of oil so as to create a gum base having a softening point that is lower than the softening point of the gum base had wax been present; and
adding less than 30% by weight of a bulking agent; and
adding flavor to the gum base in an amount that is less than the amount of flavor that would be required in a chewing gum constructed from a wax containing base to produce the same flavor chew characteristics.

48. The method of claim 47 including the step of adding artificial flavor to the gum base.

49. The method of claim 47 including the step of adding a bulking agent to the gum base.

50. The method of claim 47 wherein the bulking agent is a low calorie bulking agent.

51. A method for creating a low calorie, high base chewing gum base comprising the steps of:
creating a gum base from at least an elastomer, an elastomer plasticizer, polyvinyl acetate, and a softener;
choosing the percent and type of at least the softener or the elastomer plasticizer to create a gum base having characteristics substantially similar to a similar gum base including wax; and
adding to the gum base an amount of flavor that is less than an amount required to be added to a low calorie, high base chewing gum, including wax, to achieve similar chewing flavor characteristics.

52. A method for creating a more cost effective low calorie, high base chewing gum comprising the step of eliminating wax from a gum base used to construct the chewing gum and thereby reducing the level of flavoring agents required for a resultant low calorie, high base chewing gum.

53. A low calorie, high base chewing gum comprising:
at least 90% by weight of a wax-free gum base;
no bulking agent; and
at least one flavor agent.

54. A low calorie, high base chewing gum comprising:
70 to 90% by weight of a wax-free gum base;
less than 30% of a low calorie bulking agent; and
not more than 6.5% by weight of flavoring agents.

* * * * *